Sept. 30, 1941.  J. D. MALMQVIST  2,257,423
DETERMINING THE VELOCITY OF ELASTIC WAVES IN THE GROUND
Filed June 20, 1939
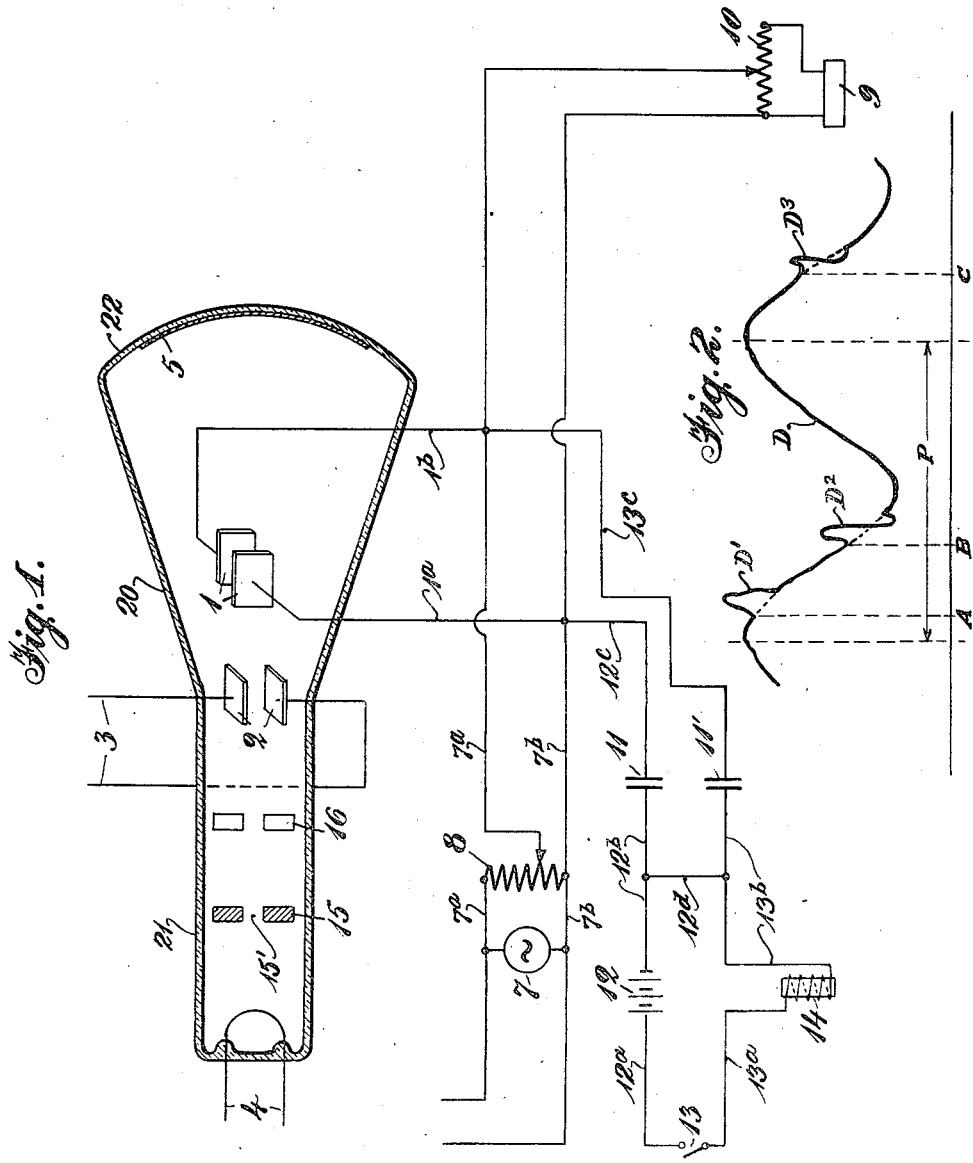
Inventor
Johan David Malmqvist
By Stevens and Davis
Attorneys Patented Sept. 30, 1941

2,257,423

UNITED STATES PATENT OFFICE 2,257,423

DETERMINING THE VELOCITY OF ELASTIC WAVES IN THE GROUND

Johan David Malmqvist, Stockholm, Sweden, assignor to Bolidens Gruvaktiebolag, Stockholm, Sweden, a limited joint-stock company of Sweden Application June 20, 1939, Serial No. 280,161
In Sweden June 18, 1938

2 Claims. (Cl. 181—0.5)

A great number of seismic methods have been developed within the field of applied geophysics during the last two decades. These methods are based on the fact that sound waves or elastic waves are propagated through the ground at different velocities, depending on the rocks or minerals through which they pass. A feature common to most of the seismic methods consequently is the method of determining the velocity at which elastic waves are propagated between different points in the field. This is effected by a very accurate measurement of the time elapsing between the transmission of an elastic wave impulse at one point (caused artificially, for instance, by exploding a charge of high explosive) and the time of arrival at certain systematically selected points in the field round the point of transmission. From the velocities of propagation determined in this manner, the depths of the rock or mineral strata lying more or less horizontally above one another may then be calculated, if the difference in the velocity of propagation is somewhat pronounced for the various strata. Likewise, in the same manner the depth of the limit stratum between the overburden and the bedrock can be determined, and the nature of the bedrock by the overburden can be established. Since solid ores have in most cases considerably smaller velocities of propagation than has the surrounding bedrock, these velocity determination may also be applied in prospecting for ores.

In seismic methods, the point of shock as well as the times of arrival and the amplitudes of the elastic waves are generally recorded photographically, the impulses of said waves being detected by means of so-called seismographs (for which purpose various geophone constructions may also be brought into use). The oscillation amplitude as well as the time of the transmission and the times of arrival at the points of observation are recorded on a photographic film strip moving at a constant speed, and the differences in time can then be readily determined on the film strip, if at the same time certain definite time intervals are recorded on the latter, for instance by marking the position for each second or each definite fraction of a second. These time marking impulses are transmitted from a chronometer, for example.

The oscillation impulses of the arriving sound waves, which are received at the points of observation by geophones, are transformed in the latter by means of an electromagnetic or electrolytic device, a condenser geophone, or a piezo- quartz crystal, into an alternating electric current which is conducted through a cable to the recording instrument, where the alternating current acts upon a moving-mirror galvanometer, or upon a string galvanometer, the vibrations of which as caused by the influence of the current are transferred to the film strip by optical means.

It has been found difficult, however, to determine very small time intervals on account of a certain sluggishness of the galvanometers in question. The sluggishness of the galvanometers will in the first place result in that the sound wave impulse is not recorded absolutely instantaneously when it sets in, while also, after the oscillation impulse from the geophone has once ceased, the movable parts of the galvanometers continue to vibrate on account of their natural oscillation. It is possible by severe damping to reduce the time of the natural oscillation, it is true, but it has proved very difficult entirely to eliminate this effect.

The present invention is principally distinguished by the feature that the recording of the oscillation impulses and of the differences in time between the same is performed by means of a cathode ray oscillograph. The advantage of this method is that the cathode ray oscillograph responds absolutely instantaneously to current impulses, since it operates without any inertia whatever. As a recording instrument it consequently answers the very exacting demands to be placed on such an instrument, particularly in the determination of the overburden depths, wherein the establishment of depths less than 2 meters is frequently brought into consideration. In the determination of the overburden depths, the effect of the first sound wave impulse propagated through the surface of the ground will be very much weakened before any recording of the reflection wave is commenced, which is caused by reflection in the limit stratum between the overburden and the bedrock. In such cases where the depth is of the above-named order of magnitude, it is not possible, however, to anticipate any greater difference in time than $1/100$–$1/1000$ of a second between the direct and the reflected sound waves, which is believed to bring forth the importance of the instrument operating without inertia and without any natural oscillation in consequence thereto.

A mode of carrying this invention into effect is to cause the current impulses transmitted from the geophones to be superimposed upon a sine-curved alternating current of a certain definite frequency, which is transmitted from a source of alternating current, for instance from a tube generator. The alternating current is distributed in the ordinary manner over the fluorescent screen of the cathode ray tube, and the wave motion of the alternating current is photographed by means of a camera directed to the fluorescent screen. The exposure is commenced immediately prior to the moment of exploding the charge, at which a current impulse is transmitted through the cathode ray tube by an electromagnetic device or in some other way.

Figure 1 is a diagrammatic view of a cathode ray oscillograph and the circuit connections therefor as used in this invention.

Figure 2 is a diagrammatic view of the record of an oscillogram taken from the apparatus disclosed in Figure 1.

In the apparatus shown in Figure 1 there is provided a vacuum tube 20 having a cylindrical neck 21 closed at one end. The forward end of this vacuum tube is segmento-spherical. At the closed end of the tube there is provided a hot filament cathode 4. Within the neck 21 and spaced from the cathode 4 is an anode 15 having a ray opening 15'. Also a screen 66 is positioned in the neck 21 and spaced from the anode 15 on the side opposite the cathode 4. Between screen 16 and the end 22 of the tube is provided a pair of parallel plates 2 which are preferably arranged horizontally. By means of leads 3 connected to the respective plates 2 a cyclic alternating potential is impressed on the plates 2, the leads 3 receiving such potential from any suitable source. Between the plates 2 and the end 22 is a second pair of parallel plates 1, these plates being vertically arranged. The plates of each pair are spaced equally from the axis of the tube and on the end 22 there is provided a fluorescent screen 5.

At 7 is an alternating current source such as a tube generator and which will produce a sine-curved alternating current of a certain definite frequency in which the number of alternations per second is known. From this source extend leads 7ᵃ and 7ᵇ which are connected to the terminals of a geophone 9. A variable resistance 8 is bridged across the leads 7ᵃ and 7ᵇ adjacent the source 7 and a second variable resistance 10 is bridged across the leads 7ᵃ and 7ᵇ adjacent the geophone 9. The plates 1 are connected to the leads 7ᵃ and 7ᵇ by conductors 1ᵃ and 1ᵇ.

At 12 is a battery or other suitable source of direct current. One terminal of the battery is connected by a conductor 12ᵃ to a switch 13 which is in turn connected by a conductor 13ᵃ to a charge firing device indicated in general at 14. The other terminal of the battery 12 is connected by a conductor 12ᵇ to a condenser 11 and the remaining side of the condenser is connected by a conductor 12ᶜ to one of the plates 1 through the conductor 1ᵃ. The firing device 14 is connected by a conductor 13ᵇ to one side of a condenser 14', the other side of this condenser being connected by a conductor 13ᶜ to the remaining plate 1 through the conductor 1ᵇ. A bridging conductor 12ᵈ connects the conductors 12ᵇ and 13ᵇ.

In the operation of the device just described when the cathode 4 is heated an electron beam will pass from the cathode to the screen 5 causing the appearance of a bright spot thereon. Due to the cyclic charge on the plates 2 this beam will be rapidly oscillated in a horizontal direction. At the same time, the beam will be oscillated vertically between the pair of the plates 1 so as to produce a sinuous curve D as shown in Figure 2.

If now the switch 13, which is normally open, be closed and at the same time the camera positioned in front of the tube 20 has its shutter opened, the device 14 will act to produce an explosion of a charge of dynamite or the like. Instantaneously with this discharge a further charge will be given the plates 1 through the condensers 11 and 11'. This will effect the producing of the small deflections in the trace of the curve such as appears in Figure 2 at D'. The explosion of the charge will cause a seismic wave to pass from the location of the explosive to the geophone and the action of the geophone will again impress the plates 1 with an additional charge so that on the curve D there will be deflections D'' produced. Also the seismic wave produced will pass down into the earth until it strikes the stratum the depth of which is to be determined and will then be reflected to again act on the geophone and produce curve deflections as at D³. Obviously, if the geophone is close to the point of explosion the deflections at D' produced directly and from the geophone will coincide. In this case the deflections at D'' would represent those caused by reflections from the wave stratum the depth of which it is desired to ascertain and the deflections at D³ would represent those caused by the reflection from a second stratum.

Figure 2 of the drawing shows diagrammatically the record of an oscillogram, wherein the superposed alternating current has a certain frequency. The time of exposure of one period (denoted by P in the drawing) $=\frac{1}{50}$ second, if the periodicity is 50, for example. From this it will be seen that with the aid of such an oscillogram it will be possible with great accuracy to determine the difference in time between the discharging impulse A and the direct wave impulse B and the reflected wave impulse C respectively.

Another method according to the invention is to record the disturbing impulses only at the recording of the oscillogram. To determine the differences in time, this record is then compared with the record of an oscillogram made earlier or later, in which an alternating current of known frequency has been recorded.

In trials performed, it has been found that a cathode ray oscillograph of up-to-date construction together with the photographic equipment associated therewith may be readily rebuilt for field purposes, and employed in the above described manner.

Having thus described my invention I declare that what I claim is:

1. That method of measuring the velocity of propagation of seismic impulses through the ground which consists in producing a cathode ray, causing said ray to oscillate under the influence of a sine-curved alternating current of definite frequency, causing the production of a seismic shock in the ground and thereby imposing for an instant a second electric current on the sine-curved current to vary the oscillation and distort the path of the cathode ray, causing said shock to again impose for an instant the second current on the sine-curved current from a point in the ground spaced at a known distance from the point of origin of the shock whereby to again vary the oscillation and distort the path of the ray oscillations rendering the ray oscillations visible, and determining the distance between the two distortions and therefrom determining the velocity of propagation.

2. That method of measuring the velocity of propagation of seismic impulses through the ground which consists in producing a cathode ray, causing said ray to oscillate under the influence of a sine-curved alternating current of definite frequency, causing the production of a seismic shock in the ground and thereby imposing for an instant a second electric current on the sine-curved current to vary the oscillation and distort the path of the cathode ray, causing said shock to again impose for an instant the second current on the sine-curved current from a point in the ground spaced at a known distance from the point of origin of the shock whereby to again vary the oscillation and distort the path of the ray oscillations rendering the ray oscillations visible, photographically recording the path of oscillation of the cathode ray, measuring the distance between the two distortions thereof, and from the known velocity of oscillation of the ray under the influence of the sine-curved current determining the velocity of propagation of the seismic shock.

JOHAN DAVID MALMQVIST.